(12) United States Patent
Robinson

(10) Patent No.: US 8,175,393 B2
(45) Date of Patent: May 8, 2012

(54) MULTI-PHENOMENOLOGY OBJECT DETECTION

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/843,506

(22) Filed: Jul. 26, 2010

(65) Prior Publication Data
US 2012/0020515 A1    Jan. 26, 2012

(51) Int. Cl.
*G06K 9/66* (2006.01)
(52) U.S. Cl. ........ 382/194; 348/169; 348/170; 348/171; 342/22; 342/23; 342/24; 342/25; 342/26
(58) Field of Classification Search .................. 382/100, 382/103, 104, 106, 107; 348/169–171; 342/22–27, 342/188–109, 196
See application file for complete search history.

(56) References Cited

U.S. PATENT DOCUMENTS

| | | | |
|---|---|---|---|
| 5,264,916 A * | 11/1993 | Bushman | 356/364 |
| 5,912,993 A | 6/1999 | Puetter et al. | |
| 5,960,097 A * | 9/1999 | Pfeiffer et al. | 382/103 |
| 7,236,613 B2 | 6/2007 | Murata | |
| 2005/0045825 A1 * | 3/2005 | Murata | 250/342 |
| 2007/0194976 A1 * | 8/2007 | Reed et al. | 342/22 |

OTHER PUBLICATIONS

Robinson et al., "Wideband Hyperspectral Imaging for Space Situational Awareness", The Adv. Maui Optical and Space Surveillance Technologies Conf., The Maui Economic Development Board, p. E25 (2006).

* cited by examiner

*Primary Examiner* — Atiba O Fitzpatrick
(74) *Attorney, Agent, or Firm* — Pillsbury Winthrop Shaw Pittman LLP

(57) ABSTRACT

Method and system for utilizing multiple phenomenological techniques to resolve closely spaced objects during imaging includes detecting a plurality of closely spaced objects through the imaging of a target area by an array, and spreading electromagnetic radiation received from the target area across several pixels. During the imaging, different phenomenological techniques may be applied to capture discriminating features that may affect a centroid of the electromagnetic radiation received on the array. Comparing the locations of the centroids over multiple images may be used to resolve a number of objects imaged by the array. Examples of such phenomenological discriminating techniques may include imaging the target area in multiple polarities of light or in multiple spectral bands of light. Another embodiment includes time-lapse imaging of the target area, to compare time lapse centroids for multiple movement signal characteristics over pluralities of pixels on the array.

21 Claims, 11 Drawing Sheets

MULTI-PHENOMENOLOGY OBJECT DETECTION

BACKGROUND

This disclosure relates generally to object detection. More particularly, this disclosure relates to the resolution of closely spaced objects in an image.

The detection, location, and characterization of closely spaced targets and objects at a long observation range are useful in a multitude of contexts. The application of such techniques is found in space situational awareness, missile defense (including tracking as well as discrimination of targets), and astronomy research. For example, in the context of space situational awareness, the characterization of closely spaced objects may be used in the ground detection of small "intruder" satellites that may be near large geostationary earth orbit satellites.

Resolving ability in imaging, whether through a filled aperture telescope, or a plurality of telescopes utilizing interferometric techniques, is physically limited by a number of criteria, including diffraction limitations, other point spread function factors, the signal to noise ratio (SNR) of the received electromagnetic radiation, and the pixel sample size at the focal plane. For example, the empirically derived Rayleigh diffraction limit of 1.22 $\lambda/D$ is generally accepted as corresponding to the minimum angular resolution at which two identically sized objects may be sufficiently resolved. The difficulty in attempting to overcome such physical limitations to resolve two or more closely spaced objects increases, however, when one object is either larger or brighter than the others.

Some statistical analysis methods may be employed to assist in resolving an image. For example, hypothesis testing techniques such as the known Pixon method may succeed in resolving images beyond the Rayleigh resolution limit, however may be limited by a high SNR requirement with very fine sampling levels. Such hypothesis testing makes educated guesses at the details of the observation (including object sizes and separations), and works backwards to get the best fit to the reconstructed and highly sampled image. This process may require extensive computation capabilities to run through what might amount to be millions of possible scenarios.

What is needed is, among other things, improvements over known techniques to resolve closely spaced objects though the use of a variety of phenomenologies, either alone or in combination.

SUMMARY

According to an embodiment, a method for resolving a number of objects in a target area is disclosed. The method includes imaging the target area with an array that is configured to detect a first image characteristic associated with electromagnetic radiation received at the array from the target area. The method also includes further imaging the target area with the array, where the array is configured to detect a second image characteristic associated with the electromagnetic radiation received at the array from the target area. In the method, the second image characteristic is different from the first image characteristic. The method additionally provides for computing, on measurements made by the array, a first centroid for the first image characteristic and a second centroid for the second image characteristic. The method goes on to include comparing locations of the first and second centroids, and, as a result of this comparison, resolving the number of objects imaged by the array.

According to an embodiment, a method for resolving a number of objects in a target area is disclosed. The method includes performing time-lapse imaging of the target area with an array configured to detect electromagnetic radiation received at the array from the target area. The method also includes calculating a first target motion-related signal characteristic at least from variations in frequencies, amplitudes, and or phases over each of a first plurality of pixels on the array throughout the time-lapse imaging, and a second target motion-related signal characteristic at least from variations in frequencies, amplitudes and/or phases over each of a second plurality of pixels on the array throughout the time-lapse imaging. The method additionally provides for computing, on the array, a first centroid for the first target motion-related signal characteristic, and a second centroid for the second target motion-related signal characteristic. The method goes on to provide for comparing time-lapse locations of the first and second centroids, and in response to this comparison, resolving the number of objects imaged by the array.

According to an embodiment, a system for resolving a number of objects in a target area is disclosed. The system includes an imager configured to image the target area with an array configured to detect a first image characteristic associated with electromagnetic radiation received at the planar array from the target area. The imager is further configured to further image the target area with the array configured to detect a second image characteristic associated with the electromagnetic radiation received at the planar array from the target area. In the system, the second image characteristic is different from the first image characteristic. The system further includes a processing device configured to compute a first centroid for the first image characteristic and a second centroid for the second image characteristic. The processing device is further configured to compare respective intensities and locations of the first and second centroids, and in response to the comparison of the first and second centroids, resolve the number of objects imaged by the array.

Other aspects and embodiments will become apparent from the following detailed description, the accompanying drawings, and the appended claims.

BRIEF DESCRIPTION OF THE DRAWINGS

Various features of embodiments of this disclosure are shown in the drawings, in which like reference numerals designate like elements.

DETAILED DESCRIPTION

Figure 1:
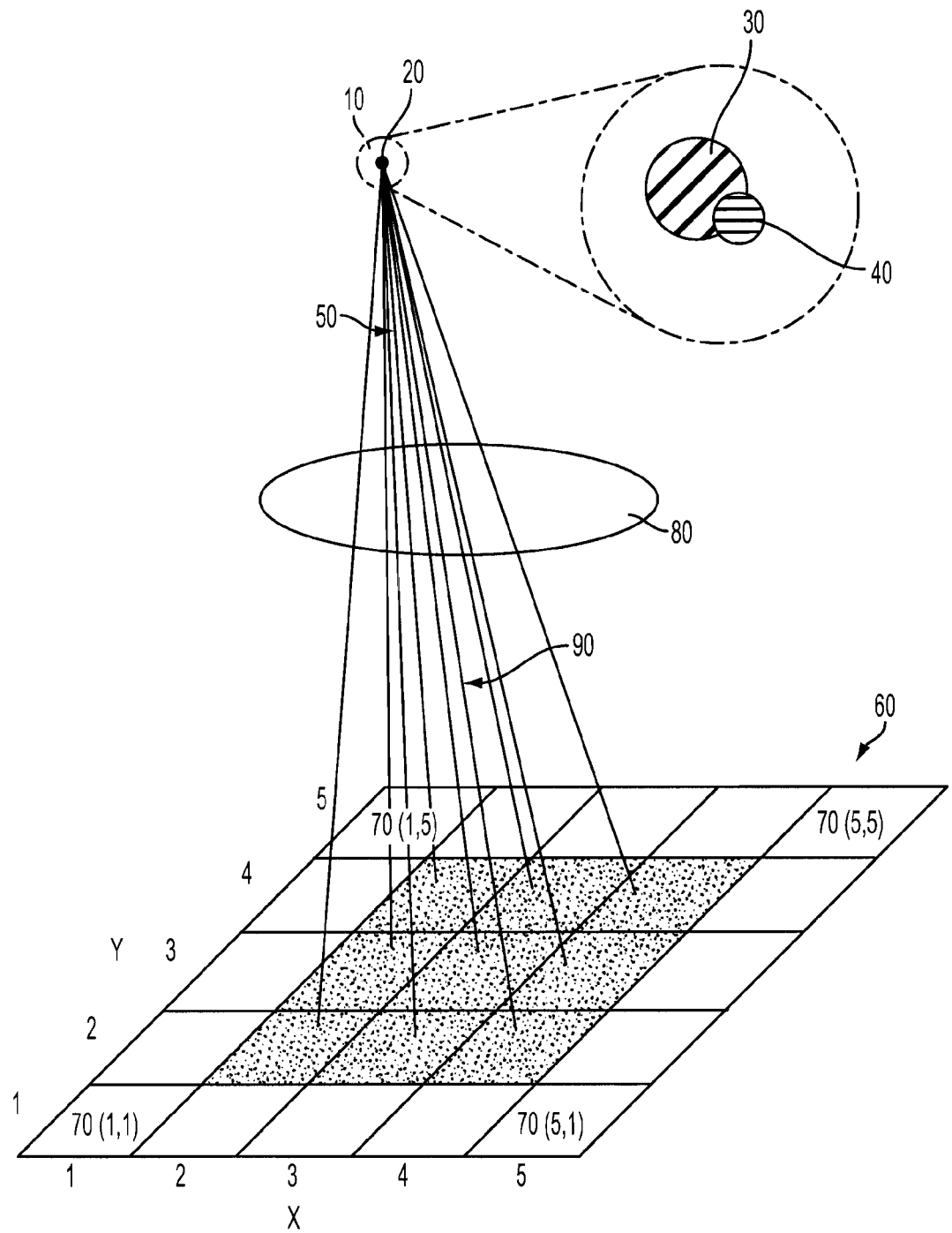
FIG. 1 schematically illustrates the sensing of an image by a array through the filter of a discriminating phenomenology, with received electromagnetic radiation spread over a plurality of pixels on the array.

FIG. 1 illustrates the sensing of target area 10. Inside target area 10 there may be a pair of closely spaced objects 20, which may include target object 30 and intruder 40. The pair of closely spaced objects 20 may be sufficiently small compared to the observation range that it may act as a point source. Target object 30 may be any suitable object, including but not limited to stellar objects such as a star, a planet, a moon, a comet, or an asteroid. Target object 30 may also be a man-made object, including but not limited to a satellite or a missile. Similarly, intruder object 40 may also be any suitable object, including but not limited to the stellar or manmade objects listed in the non-limiting examples above. In some cases, intruder object 40 may be physically smaller than target object 30, or may have less intensity than target object 30. In some cases, intruder object 40 may be moving relative to target object 30. Prior detection techniques, including centroid calculations, may not generally detect the presence of multiple closely spaced objects (CSOs), and may provide inaccurate object locations when multiple CSOs are present.

The sensing of target area 10 may be accomplished by any appropriate mechanism, including but not limited to direct observation, and enhanced observation, such as through a telescope, of electromagnetic radiation 50 that is either emitted or reflected by target object 30 and/or intruder object 40. Not shown in FIG. 1 is any of a number of optical elements, such as lenses, mirrors, and so on, which may focus and enhance electromagnetic radiation 50 received from target object 30 and/or intruder object 40. In various embodiments, electromagnetic radiation 50 may be reflected sunlight, emitted light, or thermal signatures.

The sensing of target area 10 may be by imaging received electromagnetic radiation 50 on array 60. Array 60 may be of any suitable construction or configuration, including but not limited to photographic film, a Charge-Coupled Device (CCD), a Complementary Metal-Oxide Semiconductor (CMOS), or a Focal Plane Array (FPA). In some cases, intruder object 40 and target object 30 may be partially overlapping from the perspective of array 60. For example, target object 30 and intruder object 40 may both be orbiting objects, and array 60 may be located on the Earth. In other examples, array 60 may be located on an orbiting object itself, such as a satellite. In some cases, target object 30 may be a satellite, such as a geostationary satellite, while intruder object 40 may be a smaller satellite, a piece of space debris, a missile, or so on. As another non-limiting example, both target object 30 and intruder object 40 may be missiles. As another non-limiting example, target object 30 may be a distant star, while intruder object 40 may be an extrasolar planet. Likewise, both target object 30 and intruder object 40 may be distant stars, either apparently close from the perspective of array 60, or relatively close by being part of a binary star system. In an embodiment, the distance to target object 30 and/or intruder object 40 may be such that target object 30 and/or intruder object 40 (i.e. pair of closely spaced objects 20) appear as a point source.

As seen in the illustrated embodiment, array 60 may comprise plurality of pixels 70, individually denoted as pixel 70(x,y), wherein x and y are coordinates as seen in the illustrated embodiment of the Figures. For example, in FIG. 1, electromagnetic radiation 50 is spread over plurality of pixels 70, such that a portion of electromagnetic radiation 50 is received on each of pixels 70(2,2), 70(3,2), 70(4,2), 70(2,3), 70(3,3), 70(4,3), 70(2,4), 70(3,4), and 70(4,4). Also shown in FIG. 1 is that electromagnetic radiation 50 may be filtered through filter 80, so that array 60 may image target area 10 in multiple phenomenologies, whereby different image characteristics associated with electromagnetic radiation 50 may be observed. In an embodiment, electromagnetic radiation 50 may be characterized as filtered radiation 90 once it passes through filter 80. In an embodiment, analysis of electromagnetic radiation 50 over multiple phenomenologies may be performed via analysis of electromagnetic radiation 50 on array 60, and filter 80 may be omitted. Various embodiments of filter 80 are discussed in greater detail below.

Figure 2:
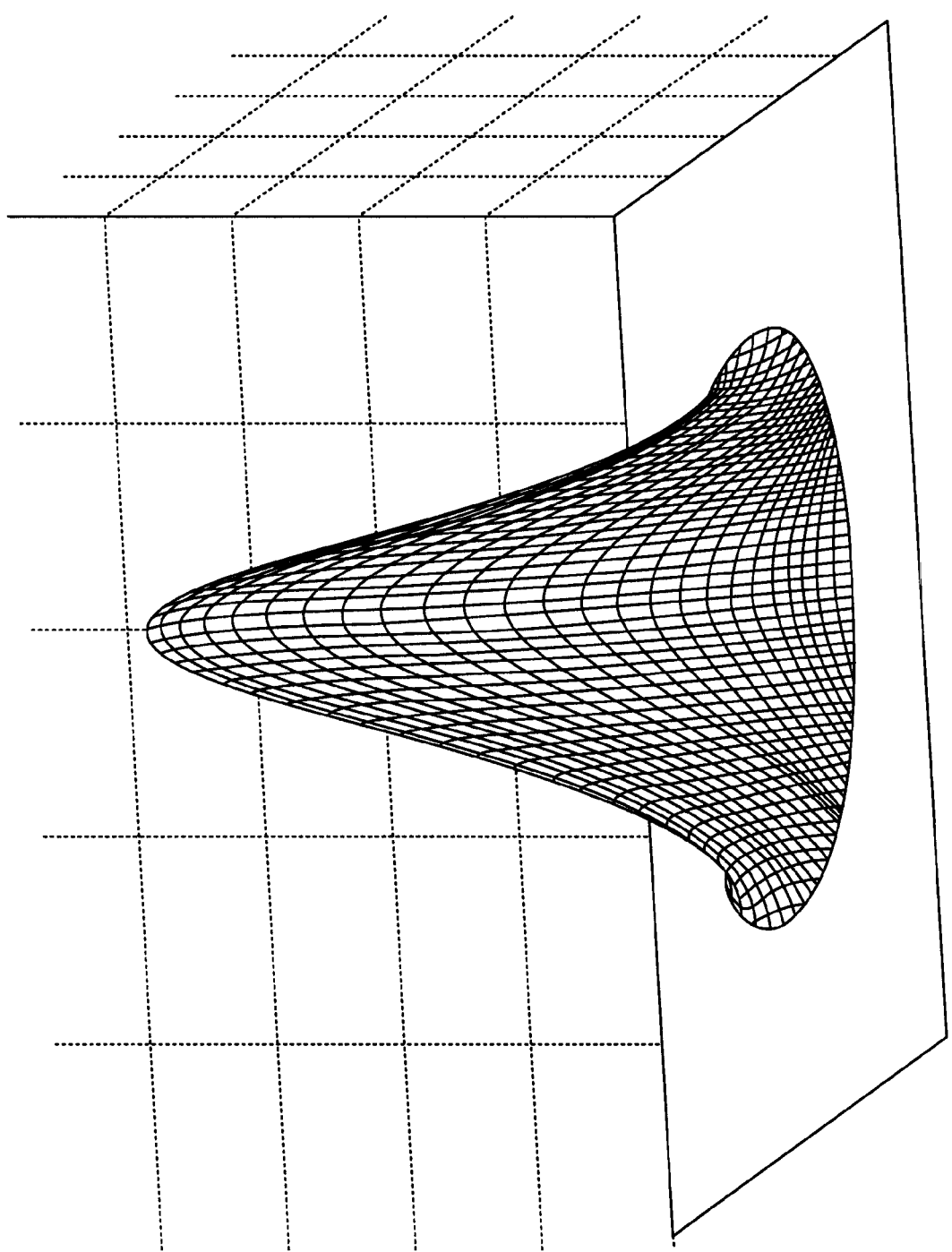
FIG. 2 shows a graph representing the distribution of energy received from a single object on the array during an observation.

Turning now to FIG. 2, a distribution of electromagnetic radiation 50 produced by single target object 30 is illustrated, without the presence of intruder object 40. The distribution is shown prior to any sampling, and therefore the axes of the distribution are relative intensities of received electromagnetic radiation 50 in a given area. As shown, target object 30 acts as a point source, and thus the distribution is generally uniform, centered around a common point, which would be the center of mass for target object 30. In this regard, this common point may be the centroid of received electromagnetic radiation 50. The distribution is presented in the absence of noise, sampling, and calibration errors.

Figure 3:
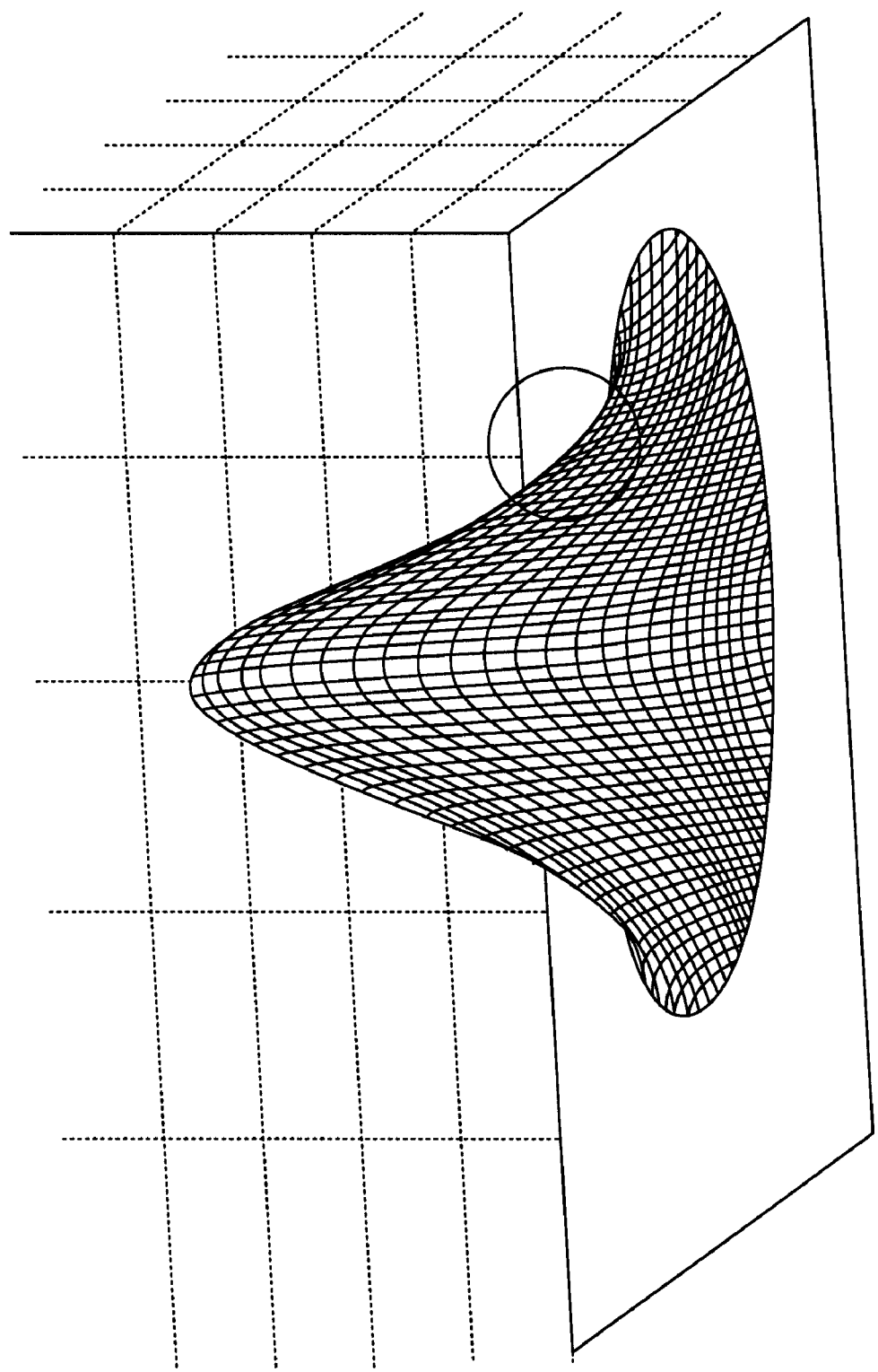
FIG. 3 shows a graph representing the distribution of energy received from closely spaced objects on the array during observation to detect a first image characteristic.
Figure 4:
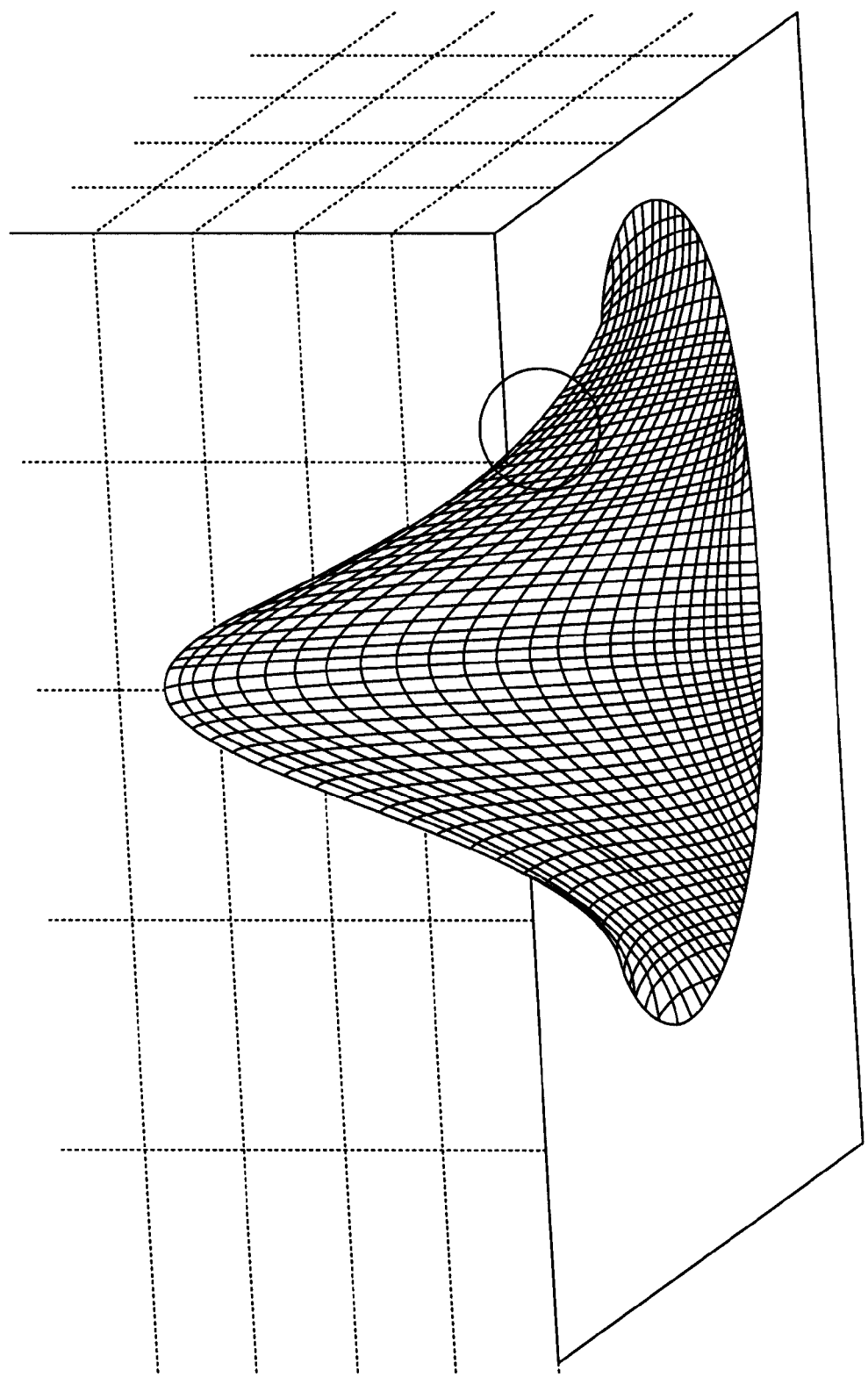
FIG. 4 shows a graph representing the distribution of energy received from closely spaced objects on the array during observation to detect a second image characteristic.

Moving to FIGS. 3 and 4, diffraction blurred distributions of electromagnetic radiation 50 produced by pair of closely spaced objects 20 are presented, including target object 30 and intruder object 40. The distributions shown are the result of target object 30 being ten times larger in area than intruder object 40. Despite this difference in area, it is shown that in the absence of noise, sampling, and calibration errors, there are observable differences in the tails of the distributions as compared to the single target object of FIG. 2. Furthermore, an observable difference between the tails of each distribution can be observed on the right hand side of each distribution. This difference in received electromagnetic radiation 50 is the result of the use of differing observational phenomenologies, as will be discussed in greater detail below.

In an embodiment, the distribution of FIG. 3 may be the result of imaging target area 10 by array 60, wherein electromagnetic radiation 50 is passed through filter 80 to be observed as filtered radiation 90. Filter 80 may be of any suitable form that can distinguish between various image characteristics associated with electromagnetic radiation 50. For example, filter 80 may be a polarizing filter, since, for example, light polarization is sensitive to material composition as well as the angle of orientation that a reflecting object (i.e. target object 30 or intruder object 40) has with respect to a light source (i.e. the sun). In various embodiments wherein filter 80 is a polarizing filter, filter 80 may be linearly polarized or circularly polarized. In such embodiments, filtered radiation 90 may comprise polarized light. In another embodiment, filter 80 may be spectroscopic in nature, and may isolate or discriminate against certain spectral bands of electromagnetic radiation 50. For example, filter 80 may isolate green light, red light, blue light, or so on, such that only that light reaches array 60. In such embodiments, filtered radiation 90 may be green light, red light, blue light, or any other color. In another embodiment, filter 80 may allow all light but the isolated light to reach array 60. As seen in FIG. 3, the distribution of filtered radiation 90 isolating a first image characteristic may result in electromagnetic radiation 50 from intruder object 40 being observable as filtered radiation 90 that is 0.1× that of target object 30.

Moving to FIG. 4, different filter 80 may be used to distinguish different image characteristics associated with electromagnetic radiation 50. For example, if filter 80 for the observation in FIG. 3 was linearly polarized, filter 80 for the observation of FIG. 4 may be linearly polarized, but having a different rotation (i.e. vertical, instead of horizontal). In an embodiment, the polarizations of filter 80 in each observation may be orthogonal to one another. In another embodiment, the polarization may be circular for one observation, but linear for another. In another embodiment, wherein filter 80 is spectroscopic in nature, the first observation may be in red light, while the second observation may be in green light. In a non-limiting embodiment, wherein filter 80 is spectroscopic in nature, the wavelengths of the first and second measured spectra may be at least 100 nm apart in wavelength. As shown in FIG. 4, the distribution of filtered radiation 90 isolating a second image characteristic may result in electromagnetic radiation 50 from intruder object 40 being observable as filtered radiation 90 that is 0.2× that of target object 30. As is seen, the second image characteristic has a 2:1 ratio of intensity than the first image characteristic. Observed intensity differences may result from differences in material composition, observed reflectance angle, observed emittance angle, object temperature, or for any other appropriate reason.

Figure 5:
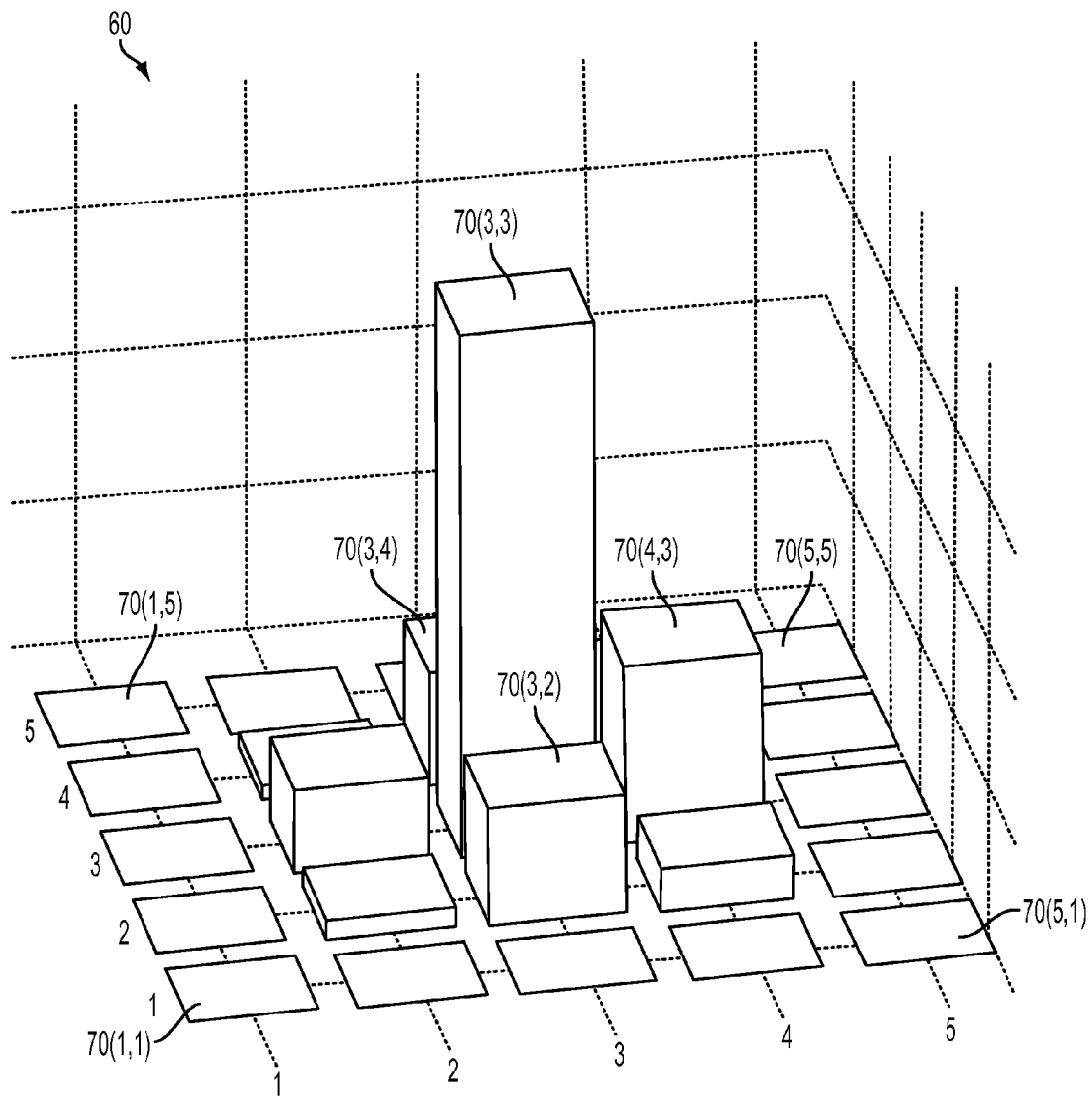
FIG. 5 shows a graph representing the distribution of energy received from the single object of FIG. 2, as sampled differently across a plurality of pixels on the array.
Figure 6:
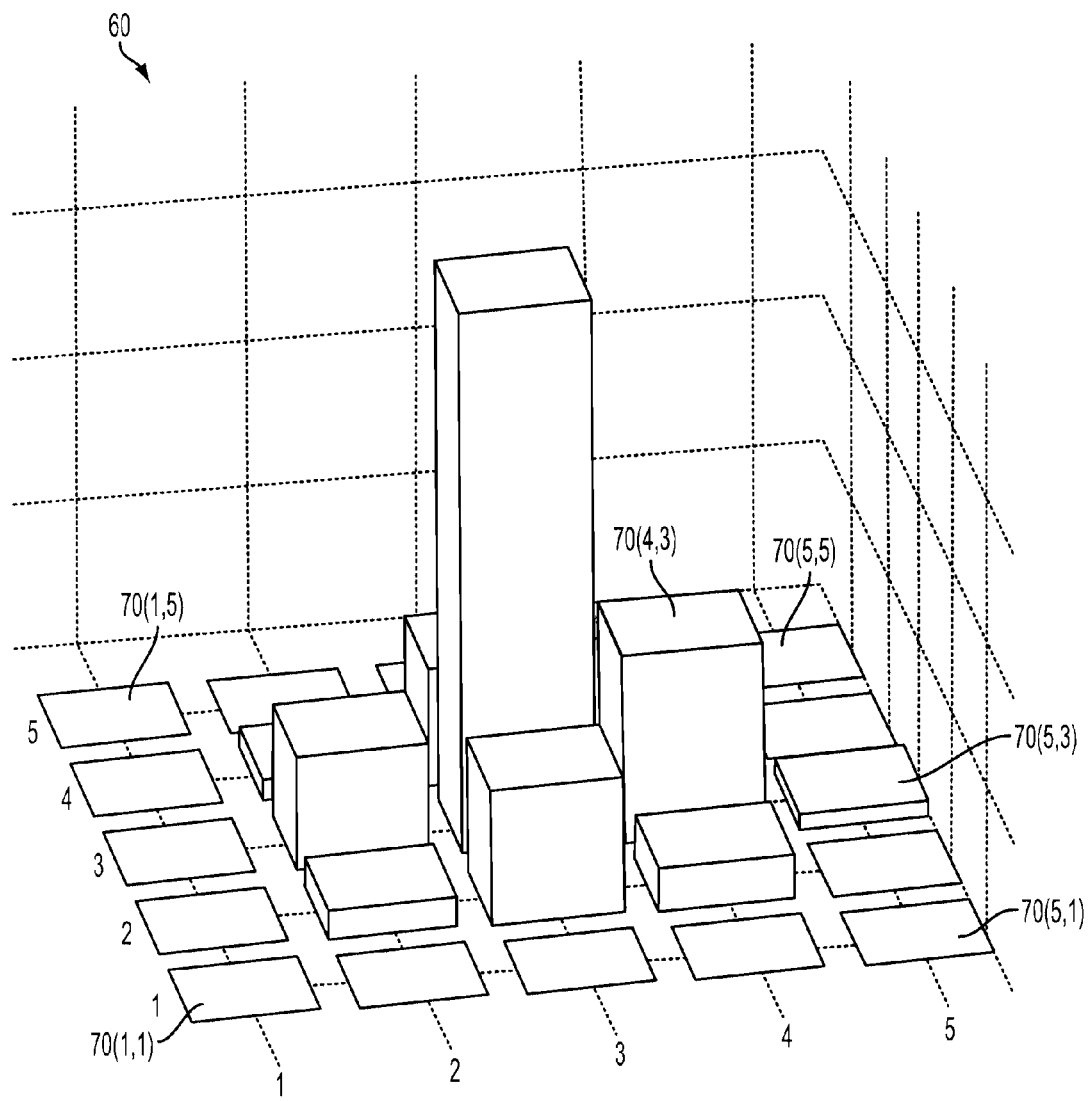
FIG. 6 shows a graph representing the distribution of energy received from closely spaced objects of FIG. 3, as sampled across a plurality of pixels on the array during an observation to detect a first image characteristic.
Figure 7:
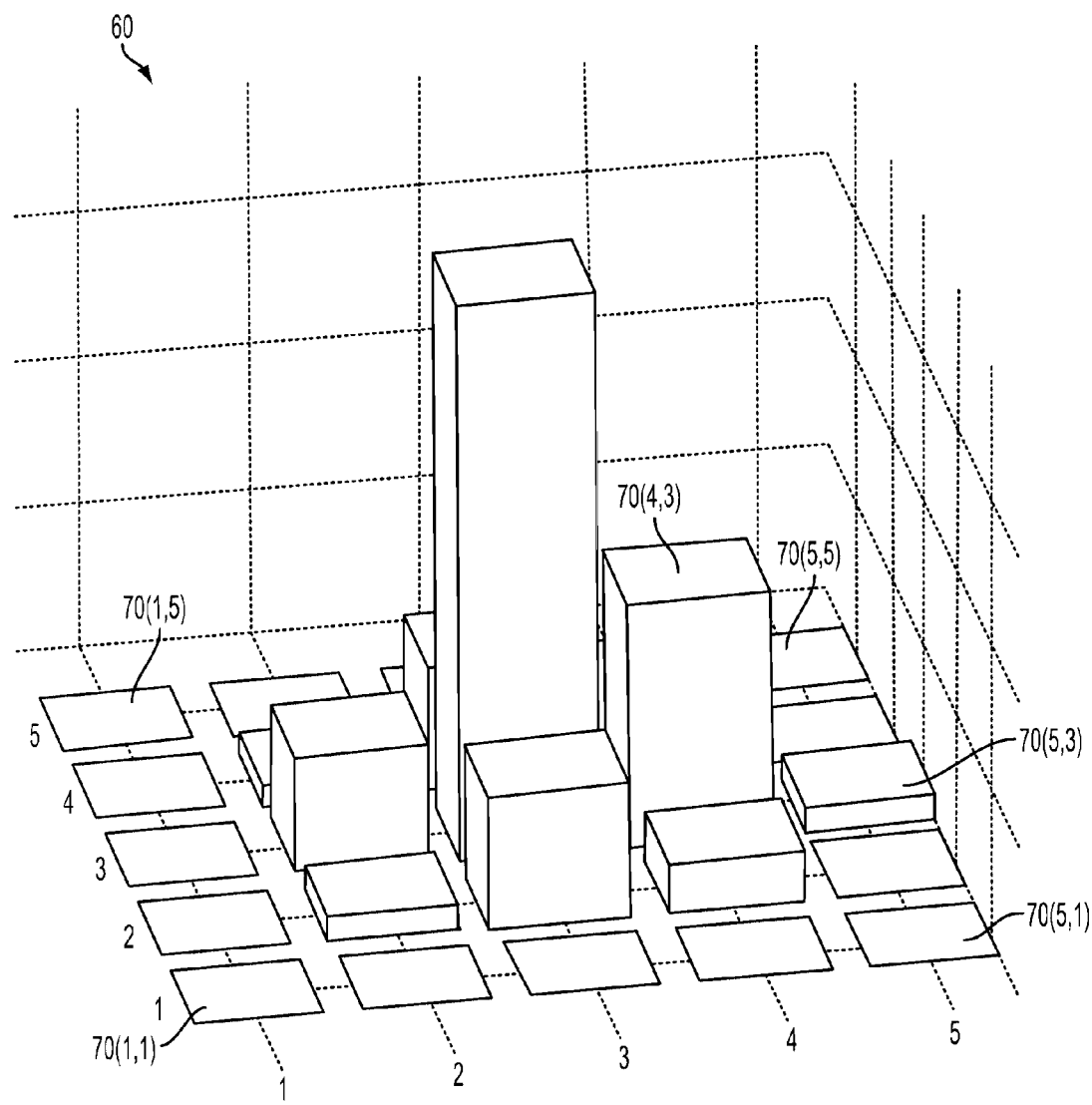
FIG. 7 shows a graph representing the distribution of energy received from closely spaced objects of FIG. 4, as sampled across the plurality of pixels on the array during an observation to detect a second image characteristic.

FIGS. 5-7 show the sampling of the distributions of electromagnetic radiation 50 (i.e. filtered radiation 90) found in FIGS. 2-4, as measured on each of plurality of pixels 70 of array 60. The amplitude found on each of plurality of pixels 70 may be determined by any suitable mechanism, including but not limited to a count of incident photons in filtered radiation 90. The amplitudes shown may be of any appropriate scale and, in an embodiment, may be represented as a percentage of received electromagnetic radiation 50.

In FIG. 5, the sampled distribution of electromagnetic radiation 50 from single target object 30 is seen, without the presence of intruder object 40. Although, as noted above with respect to FIG. 2, target object 30 acts as a point source, and thus the distribution may be generally uniform and centered around a common point, the distribution may vary as the target energy can be asymmetrically distributed over multiple pixels. As shown, the bulk of incident radiation is received on pixel 70(3,3), with lesser radiation on others of plurality of pixels 70, such as pixels 70(4,3), 70(3,2), 70(3,4), wherein the lesser radiation levels are not symmetrically distributed.

FIGS. 6 and 7 show sampled distributions of filtered radiation 90 resulting from the discrimination of electromagnetic radiation 50 to isolate the first and second image characteristics. As is shown, filtered radiation 90 received on array 60 varies depending on the isolation of the first image characteristic in FIG. 6, and the second image characteristic in FIG. 7. Again, in the non-limiting examples, filter 80 may be a polarizing filter, such that electromagnetic radiation 50 is filtered into polarized filtered radiation 90, or a spectroscopic filter, such that electromagnetic radiation 50 is filtered into filtered radiation 90 of specific wavelength bands. By altering the characteristics of filter 80 in the phenomenology, such as by observing target area 10 in different polarizations, or in different wavelength bands, the sampled distribution may change to reflect filtered radiation 90 of intruder object 40 providing a different amount of filtered radiation 90 with respect to that of target object 30 in each imaging of target area 10.

As seen in FIG. 6, the distribution of filtered radiation 90 isolating the first image characteristic may result in electromagnetic radiation 50 from intruder object 40 being observable as filtered radiation 90 that is 0.1× that of target object 30. This influence of intruder object 40 may be seen in an enhanced signal on some of plurality of pixels 70, including pixels 70(4,3) and 70(5,3), as compared to the sampled distribution of only target object 30 shown in FIG. 5. Moving to FIG. 7, the distribution of filtered radiation 90 isolating the second image characteristic may result in electromagnetic radiation 50 from intruder object 40 being observable as filtered radiation 90 that is 0.2× that of target object 30. This influence of intruder object 40 may be seen in a different enhanced signal on some of plurality of pixels 70, again including pixels 70(4,3) and 70(5,3), as compared to the sampled distribution of target object 30 and intruder object 40 shown in FIG. 6.

In some embodiments, filtering of electromagnetic radiation 50 with filter 80 in various phenomenologies, as described in the examples above, may be used to observe the existence of intruder object 40 near target object 30. In some embodiments this may not be necessary, and the analysis of electromagnetic radiation 50 on array 60 may be sufficient to discriminate between the various image characteristics. For example, in an embodiment, each of the first and second image characteristics may be computationally obtained through observing target area 10 with array 60 over time, and performing analysis of incident electromagnetic radiation 50 received on plurality of pixels 70 to determine variations in the distributions as sampled. For example, if target object 30 and intruder object 40 are each moving, such as nutation, precession, or other periodic motion, and each of target object 30 and intruder object 40 have a different frequency of motion, then analysis of variations in the signal characteristics on each of plurality of pixels 70 may establish distinct frequencies of motion for target object 30 and intruder object 40.

Figure 8:
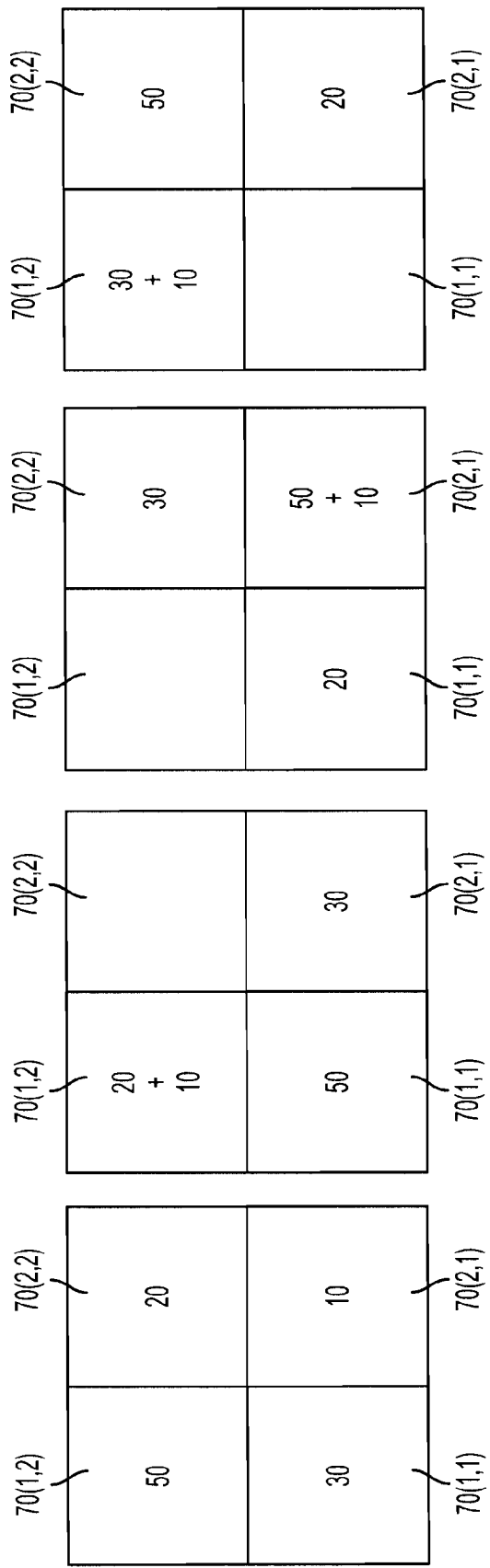
FIG. 8 shows a series of time lapse images of the energy received from closely spaced objects as sampled on a plurality of pixels on the array.

An example of this motion derived discriminatory phenomenology is illustrated in a simplified form in FIG. 8, which shows relative amplitudes of electromagnetic radiation 50 from closely spaced objects 20, as dispersed over four of plurality of pixels 70 over a period of four images A-D. As the representation is depicted, in image A, electromagnetic radiation 50 from target object 30 is initially captured predominantly by pixel 70(1,2), which receives fifty photons, but also on pixel 70(1,1), receiving thirty photons, and pixel 70(2,2), receiving 20 photons. Image A also shows pixel 70(2,1) capturing 10 photons from intruder object 40. As seen in images B-D, target object 30 is rotating counterclockwise a single pixel each image. On the other hand, intruder object 40 is rotating twice as fast as target object 30, at two pixels per image, so that it appears to jump from pixel 70(2,1) to pixel 70(1,2) between each image. Analysis of such a time-lapsed series of images (i.e. images A-D) allows for the discrimination between target object 30 and intruder object 40 based upon their frequency of rotation. The computations of more complicated frequencies, or other signal characteristics, may be obtained through any suitable method. In an embodiment, discerning multiple frequencies or other signal characteristics may be through the use of a Fourier Transform such as a Discrete Fourier Transform algorithm, or a Fast Fourier Transform algorithm. In an embodiment, a digital heterodyne may also be used in this computation process.

Figure 9:
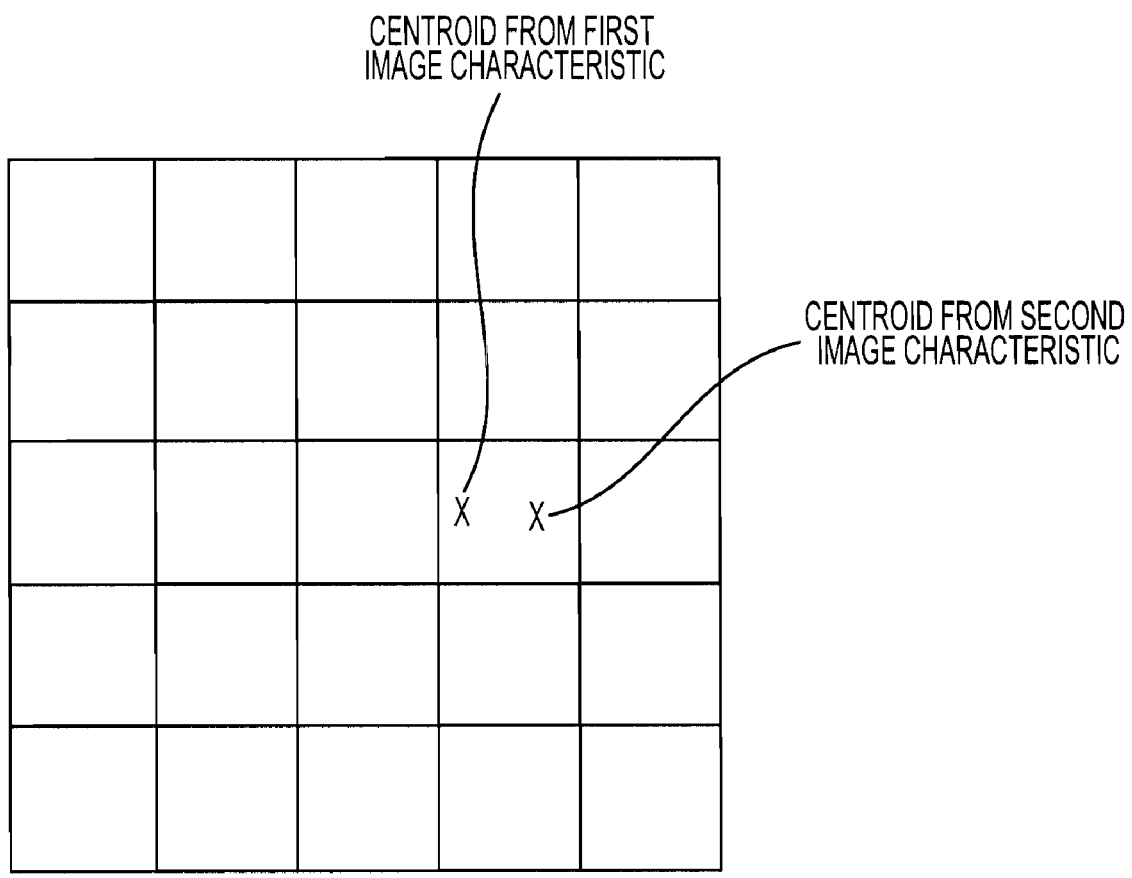
FIG. 9 shows a comparison of the centroids obtained from the measurements in FIGS. 6 and 7.

The application of varying phenomenologies on electromagnetic radiation 50 received on array 60 may not be sufficient to identify the existence of intruder object 40 and characterize its relationship to target object 30. To do such characterization, it may be beneficial to compute and compare the centroids of each measurement. Centroids of measurements may be generally more robust to noise, non-uniformity corrections, point spread function uncertainty, and other experimental error and uncertainty, and thus may provide a more useful basis of comparison than a pixel by pixel analysis. For example, as shown in FIG. 9, the centroids for each of the sampled images of FIGS. 6 and 7 may be plotted together, taking into account both which pixels received some of electromagnetic radiation 50 in each measurement, and the amplitudes on each of plurality of pixels 70, to arrive at a weighted center of mass for each measurement. By taking into account such amplitudes, sub-pixel centroid measurements may be obtained, for use in resolving a number of objects observed in target area 10, as is discussed in further detail below.

Figure 10:
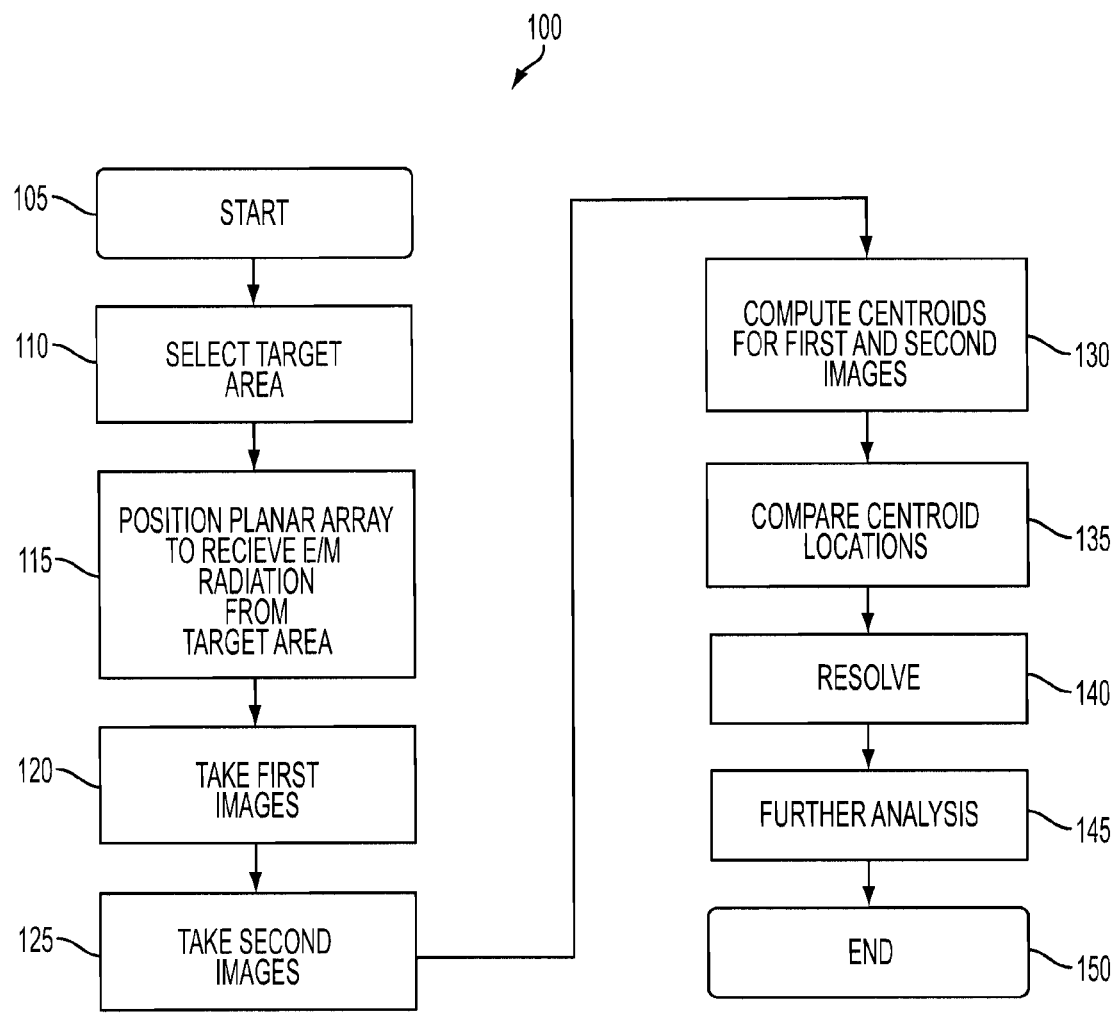
FIG. 10 shows a flow chart illustrating a method for resolving a number of objects in a target area, according to an embodiment.

As seen in the illustrated non-limiting embodiment of FIG. 10, it may therefore be useful to perform method 100 for resolving a number of objects in target area 10, which may include target object 30, and intruder object 40. In an embodiment, resolving a number of objects in target area 10 includes ascertaining that there is a higher than threshold probability that electromagnetic radiation 50 received from target area 10 is being emitted or reflected from at least the number of objects; however additional unresolved objects may be present in target area 10, and may contribute to electromagnetic radiation 50. Method 100 may start at step 105, and may include at step 110 selecting target area 10 that one wishes to observe. Selecting target area 10 may be for any reason, including but not limited to monitoring of objects for space situational awareness, missile defense (such as tracking and discrimination), or astronomical research. Once target area 10 is selected, method 100 may continue at step 115 by positioning a detector device including array 60 to receive electromagnetic radiation 50 from target area 10. The detector device may be of any suitable construction or configuration, including but not limited to a ground based telescope or a satellite based telescope. In an embodiment, the detection device may contain one or more of filter 80 that is suitable for discriminating against certain characteristics of electromagnetic radiation 50. In an embodiment, electromagnetic radiation 50 from target area 10 may be filtered through filter 80 to provide filtered radiation 90.

Once array 60 is positioned to receive electromagnetic radiation 50 from target area 10, method 100 may continue at step 120 by imaging target area 10 with array 60 configured to detect a first image characteristic associated with electromagnetic radiation 50 received at array 60 from target area 10. The first image characteristic may be of any suitable type. For example, filter 80 may configured to polarize electromagnetic radiation 50 into polarized light of a given polarization. As another example, filter 80 may be configured to filter electromagnetic radiation 50 so that only light of a given wavelength band is received upon array 60. As another example, electromagnetic radiation 50 received by array 60 may be analyzed over time to obtain a first target motion-related signal characteristic, as described above. In some embodiments, the detection device containing array 60 may have various optical components to further help shape and enhance electromagnetic radiation 50. In numerous embodiments, electromagnetic radiation 50 may be spread over multiple ones of plurality of pixels 70.

Method 100 may then continue at step 125 by performing further imaging of target area 10 with array 60 configured to detect a second image characteristic associated with electromagnetic radiation 50 received at array 60 from target area 10. In an embodiment, further imaging at step 125 may be performed simultaneously with imaging at step 120. Further imaging at step 125 may be of the same phenomenology as imaging at step 120, but may be of a different configuration.

For example, where the phenomenology of imaging at step 120 is polarimetric in nature, such as where filter 80 is configured to be linearly polarized in a horizontal direction, further imaging at step 125 may also be polarimetric, such as where filter 80 is configured to be linearly polarized in a vertical direction. Although in some embodiments, as in the prior example, such polarizations may be orthogonal, in other embodiments they may not be. As noted previously, in some embodiments, polarizations may be varying degrees of linearity, or varying degrees of circular polarization. In some embodiments, multiple polarizations may be collected that are rotated by an incremental degree. In some embodiments, the polarizations will be mixed between linearly polarized and circularly polarized. In an embodiment the multiple polarizations may be collected simultaneously, meaning that, in the present embodiment, imaging at step 120 and further imaging at step 125 would be simultaneous. Simultaneous imaging may be obtained through any suitable mechanism, including but not limited to a polarizing beamsplitter, or a Wollaston prism based polarimeter. In another embodiment, the polarizations may be collected in succession, such as through use of a filter switch or a liquid crystal display, that may rapidly alternate between polarizations for successive imaging. Such rapid or simultaneous imaging may make common certain experimental errors, such as optical degradations, issues of atmospheric seeing, or array non-uniformity.

As another example, where the phenomenology of imaging at step 120 is spectroscopic in nature, such as where filter 80 is configured to isolate electromagnetic radiation 50 of a particular wavelength band, further imaging at step 125 may also be spectroscopic, such as where filter 80 is configured to isolate electromagnetic radiation 50 of a second wavelength band. In other embodiments, filter 80 may be further configured to isolate electromagnetic radiation 50 of three or more wavelengths. In an embodiment, the first and second wavelength bands will be similar in a way that is sensitive to differences in the object. As noted, in an embodiment the wavelength of electromagnetic radiation 50 isolated in imaging at step 120 may be within the range of 100-10000 nanometers from the wavelength of electromagnetic radiation 50 isolated in further imaging at step 125. In an embodiment, the spectra related imaging in imaging at step 120 and further imaging at step 125 may be obtained simultaneously. Simultaneous imaging may be obtained through any suitable mechanism, including but not limited to through the use of a beam splitter. In another embodiment, the spectra related imagings may be collected in succession that may be rapid, such as through use of a filter wheel. Again, simultaneous or rapid succession imaging may make common certain experimental error, such as optical degradations and non-uniformity of array 60.

As another example, the phenomenology of imaging at step 120 may be motion-related. In such an embodiment, filter 80 is not necessary to the imaging, but may still be present for multi-phenomenological mixing techniques. In the motion-related phenomenology, electromagnetic radiation 50 received on array 60 may be imaged to obtain a first target motion-related signal characteristic obtained from movement of closely spaced objects 20 over time. Further imaging at step 125 may comprise obtaining a second target motion-related signal characteristic obtained from the movement of closely spaced objects 20 over time. The target motion-related signal characteristics may be calculated at least from variations of frequencies, amplitudes and/or phases over each of plurality of pixels 70. In an embodiment, the signal characteristics may be determined through use of a digital heterodyne and/or a Fourier Transform. As such a motion-related phenomenology requires a plurality of imagings to obtain time-lapse data to isolate the signal characteristics, it can be stated that imaging at step 120 and further imaging at step 125 may be performed simultaneously, as each imaging would obtain a plurality of images for the signal analysis.

Once further imaging at step 125 is performed, method 100 may continue at step 130, wherein a first centroid for the first image characteristic and a second centroid for the second image characteristic are computed based on electromagnetic radiation 50 (such as filtered radiation 90) received by array 60. The centroids may account not only for the x/y coordinate position of incident electromagnetic radiation 50 on plurality of pixels 70, but also for the amplitude of received electromagnetic radiation 50 on each pixel during the imaging. Because amplitude is accounted for in computing the centroid on the array 60, a sub-pixel centroid measurement may be obtained. For example, centroids may be measured to approximately 1/SNR times the width of diffraction blurring. As an example, if the SNR is 40, the centroid may be estimated to about 0.02 pixels. These centroid calculations may give an approximation of a center of mass from imaging at step 120, and a center of mass from further imaging at step 125. For example, the centroid for imaging at step 120 is the centroid for the first image characteristic, while the centroid for imaging at step 125 is the centroid for the second image characteristic. The computation of the centroids may be by any suitable mechanism, including on a processor embedded within the imaging device, such as part of array 60, on a processor located external to the imaging device, wherein data about the imaging is read out from array 60, or other known techniques. In an embodiment wherein the polarization is motion-related, as discussed above, the amplitude of electromagnetic radiation 50 received that is associated with each signal characteristic on the respective pixels may be utilized to compute the centroid for that signal characteristic.

Once both the first and second centroids are computed at step 130, method 100 may further include step 135 that compares the locations of the centroids. Differences in the centroids from the first and second measurements may indicate closely spaced objects 20, as opposed to single target object 30. In an embodiment, differences between the first centroid and the second centroid may indicate the direction of separation, and an estimate of the relative locations of target object 30 and intruder object 40. Even though amplitudes in two phenomenologies may be radically different, if the centroids are the same for both measurements, then it is likely that there is only target object 30, without the presence of intruder object 40. For example, where the phenomenology is polarization, the centroid of imaging at step 120 in the first polarization, and the centroid of imaging at step 125 in the second polarization may be different if there are two objects with material differences and/or surface normal (i.e. scattering angle) differences. On the other hand, if the centroids are the same in both polarizations, then it is likely that there is only one resolvable object in target area 10, such as target object 30. As another example, where the phenomenology is spectroscopic in nature, if there are two or more objects with any material differences, then centroids of imaging at step 120 and further imaging at step 125 will be different. Likewise, if the centroids are the same in all measured bands, then it is likely that there is only one resolvable object in target area 10, such as target object 30. Multiple objects may be identified if there are measurements in more than two spectral bands.

In embodiments where the phenomenology is motion-related, if there are two or more objects, such as closely spaced objects 20, where each object has different motion, such as nutation, precession, or other periodic motion, then the signals on each of plurality of pixels 70 will show two or more signals of common signal characteristics, such as frequency or phase. If, however, there is only one object, such as target object 30, in target area 10, then only one associated signal characteristic may be calculated, or only DC signals may be detected. In an alternative embodiment, however, the positions and amplitudes of the centroids may be measured over time, and a trend may be computed in each axis. Also, distinct periodicities may be measured from these measured positions. In such an embodiment, the direction of the centroid motions may map the location of the objects in target area 10. Additionally, the number of signal characteristics detected may indicate the number of objects present.

Once the centroid locations are compared at step 135, method 100 may continue at step 140 by resolving the number of objects observed by array 60 in target area 10. This resolving may comprise categorizing the differences in the first and second centroids found in step 135, as well as performing analysis such as trending the centroids, and analyzing centroid motion frequencies over time. In an embodiment, such information will be used to determine relative orbits or other relative motions. In an embodiment, "trending" the centroids may comprise trending centroid magnitude differences, or analyzing the direction of difference to provide a higher confidence of object presence and location based on object motion or differences in solar scatter angles. In an embodiment, reflected light from the sun may glint towards the array, which may enhance centroid differences, in particular where the phenomenology is polarimetric based.

In some embodiments, method 100 may continue, as shown at step 145, to perform further analysis. For example, in an embodiment, such further analysis may comprise utilizing information determined from the centroid comparison in a hypothesis testing algorithm (e.g. akin to The Pixon Method) to further resolve the objects. Such further resolution may comprise ascertaining the size of closely spaced objects 20, and their separation. In an embodiment, information derived from the centroid comparison may include a count of the objects, a separation vector between the objects, an intensity differential for the number of objects, or so on. Such information may be extremely useful to a hypothesis testing algorithm, and may reduce the number of combinations that such an algorithm must compute by orders of magnitude, to arrive at the estimated location and intensity of each imaged object.

In an embodiment, the hypothesis testing may be performed on each measured image characteristic, prior to the computation of the centroids at step 130. In an embodiment, the hypothesis testing algorithm may accept as inputs the computed centroids prior to a comparison of the centroids at step 135. In an embodiment, second array 60 may be utilized to serve as a second observer, which may enable determination of a 3D separation vector. In an embodiment, the 3D separation vector may be input into the hypothesis testing to further reduce the number of computational possibilities processed by the hypothesis testing algorithm. In some embodiments, further analysis at step 145 may comprise cueing of other sensors to more fully resolve the objects in target area 10. In an embodiment the other cued sensors may enable determination of the 3D separation vector. As above, the 3D separation vector may then be utilized in the hypothesis testing algorithm. Finally, method 100 may end at step 150.

Figure 11:
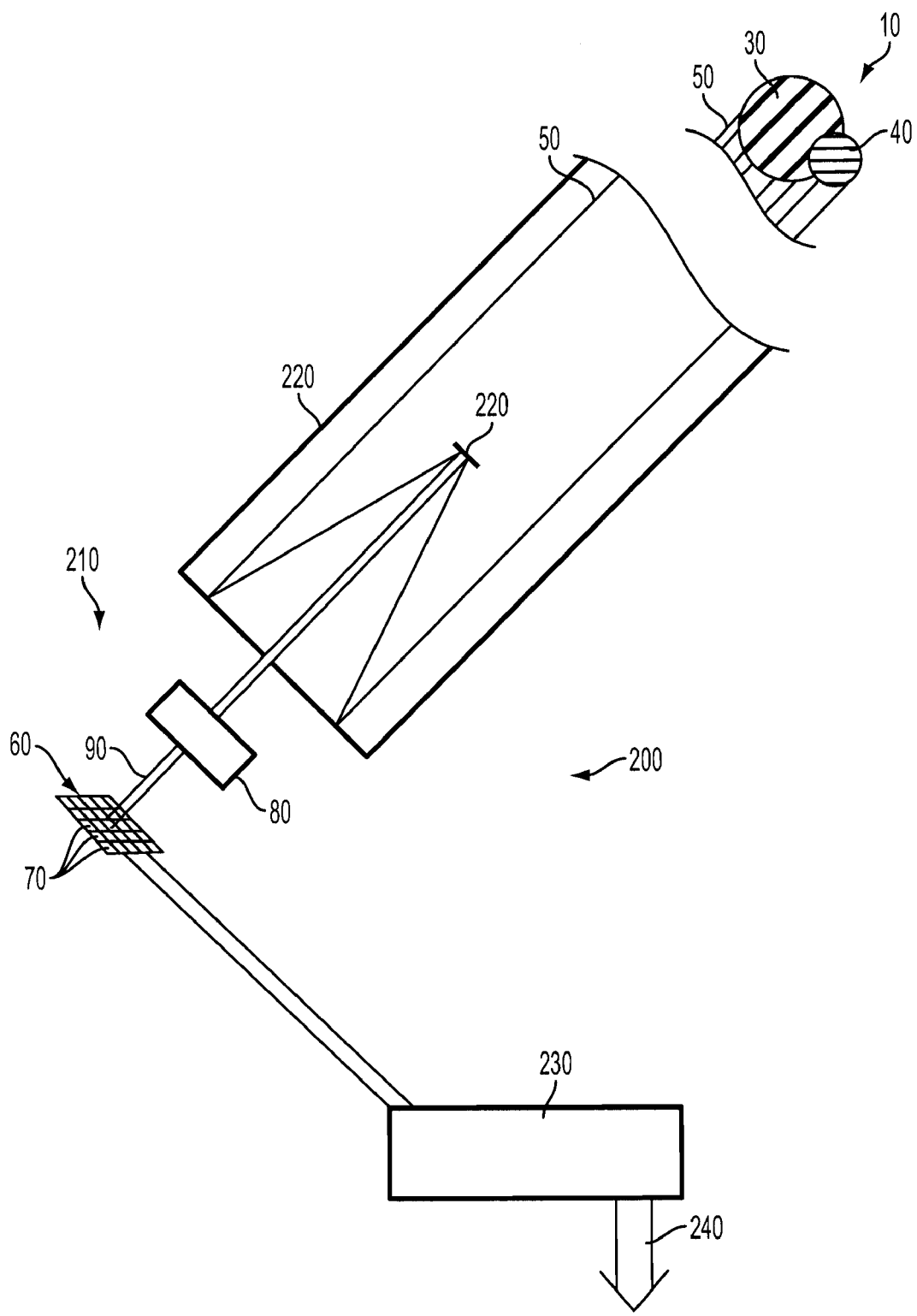
FIG. 11 schematically illustrates a system for resolving a number of objects in a target area, according to an embodiment.

Moving on to FIG. 11, an embodiment may include system 200 for resolving the number of objects in target area 10. System 200 may comprise imager 210, which may include optical elements, such as telescope 220, which may focus and enhance electromagnetic radiation 50 received from target object 30 and/or intruder object 40 located in target area 10. Imager 210 may also comprise filter 80, which may isolate or discriminate against aspects of electromagnetic radiation 80, permitting passage of filtered radiation 90 through to array 60. Filter 80 may be located anywhere between target object 30 and/or intruder object 40 and array 60, and in an embodiment may be mounted forward of the optical elements, such as telescope 220. In an embodiment, filter 80 may be a component of array 60. The positioning of filter 80 anywhere along the path of electromagnetic radiation 50 may be permissible in this embodiment. As shown, once electromagnetic radiation 50 passes through filter 80, it becomes filtered radiation 90 that is received on array 60. As noted above, electromagnetic radiation 50, including filtered radiation 90, may be spread over plurality of pixels 70 of array 60. Such distribution may be achieved by any suitable method, including but not limited to modification of the optical elements such as telescope 200, or characteristics of filter 80.

Imager 210 may be configured to image target area 10 while array 60 is configured to detect the first image characteristic associated with electromagnetic radiation 50. As noted above, array 60 may be configured to detect the first image characteristic by use of filter 80, such as by polarizing electromagnetic radiation 50, isolating certain spectral bands (i.e. measured spectra) of electromagnetic radiation 50, or so on. In an embodiment, filter 80 may not be present, or may not modify the characteristics of electromagnetic radiation 50, and array 60 may be configured to measure motions and/or frequencies based on the movements of target object 30 and/or intruder object 40, as is described above.

Imager 210 may also be configured to further image target area 10 while array 60 is configured to detect the second image characteristic associated with the electromagnetic radiation. For example, filter 80 may be configured to vary both in the phenomenology applied and the characteristics isolated in that phenomenology between taking the image and taking the further image. In another embodiment, there may be multiple imagers 210, each measuring a separate phenomenology and/or characteristic in that phenomenology. In an embodiment wherein there is only one imager 210, there may be additional optics that may split electromagnetic radiation 50 into separate beams, each associated with separate filters 80, to convert electromagnetic radiation 50 into separate filtered radiation 90. In such an embodiment, filtered radiation 90 of each beam may be associated with its own array 60, or may be directed to different portions of single array 60.

System 200 may further comprise processing device 230 that may be configured to read out each of plurality of pixels 70 on array 60 as data to be processed. Processing device 230 may compute a first centroid for the first image characteristic, and a second centroid for the second image characteristic. Processing device 230 may then compare respective intensities and locations for the first and second centroids, and may resolve the number of objects imaged by array 60 in response to the comparison of the first and second centroids. In an embodiment, processing devices 230 may further perform additional analysis, such as performing hypothesis testing corresponding to the first and second centroids. Processing device 230 may also provide output 240 to a user of system 200, such as displaying the resolved image and/or information related thereto on a monitor. In an embodiment, wherein the phenomenology is motion-related, processing device 230 may perform the calculation of the target motion-related signal characteristics detected on array 60.

While certain embodiments have been shown and described, it is evident that variations and modifications are possible that are within the spirit and scope of the inventive concept as represented by the following claims. For example, multiple phenomenologies described herein may be combined, and analyzed together. For example, the first image characteristic may be spectral in nature, while the second image characteristic may be polarimetric. As another example, the motion-related phenomenology analysis may be performed on light that has passed through filter 80, which is being analyzed in a spectral or polarimetric phenomenology. The disclosed embodiments have been provided solely to illustrate the principles of the inventive concept and should not be considered limiting in any way.

What is claimed is:

1. A method for resolving a number of objects in a target area, the method comprising:
   imaging the target area with an array configured to detect a first image characteristic associated with electromagnetic radiation received at the array from the target area;
   further imaging the target area with the array configured to detect a second image characteristic associated with the electromagnetic radiation received at the array from the target area, the second image characteristic being different from the first image characteristic;
   computing, on the array, a first centroid for the first image characteristic and a second centroid for the second image characteristic;
   comparing locations of the first and second centroids; and
   resolving the number of objects imaged by the array in response to the comparison of the first and second centroids.

2. The method of claim 1, further comprising using a hypothesis testing algorithm to resolve the number of objects by inputting at least one parameter relating to the number of objects determined through said resolving into the hypothesis testing algorithm.

3. The method of claim 2, wherein said resolving the number of objects further comprises calculating at least one of a separation vector and an intensity differential for the number of objects, and wherein the at least one parameter comprises at least one of the separation vector and the intensity differential.

4. The method of claim 1, further comprising performing a hypothesis testing algorithm on each of the measured first image characteristic and the measured second image characteristic prior to computing the first centroid for the first image characteristic and the second centroid for the second image characteristic.

5. The method of claim 1, wherein the imaging and the further imaging are performed simultaneously.

6. The method of claim 1, wherein the first and second image characteristics comprise respective first and second polarizations of the received electromagnetic radiation.

7. The method of claim 6, wherein the first polarization is orthogonal to the second polarization.

8. The method of claim 6, further comprising incrementally rotating a degree of polarization for both of the first polarization and second polarization, and repeating said imaging, computing, comparing, and resolving.

9. The method of claim 6, wherein each of the first and second polarizations are either a linear polarization, a circular polarization, or both.

10. The method of claim 1, wherein the first and second image characteristics comprise first and second measured spectra of the received electromagnetic radiation.

11. The method of claim 10, wherein wavelengths of the first and second measured spectra are within a range of approximately 100-10000 nanometers of one another.

12. The method of claim 1, wherein the first and second image characteristics are selected from the group consisting of: first and second polarizations of the received electromagnetic radiation, first and second measured spectra of the received electromagnetic radiation, and first and second signal characteristics calculated at least from variations in frequencies, amplitudes, and/or phases of each of a first and second plurality of pixels on the array, the method further comprising repeating said imaging, computing, comparing, and resolving, wherein said the first and second image characteristics of said repeated imaging are also selected from said group.

13. The method of claim 1, wherein the first image characteristic comprises a first target motion-related signal characteristic calculated at least from variations in frequencies, amplitudes and/or phases over each of a first plurality of pixels on the array, and the second image characteristic comprises a second target motion-related signal characteristic calculated at least from variations in frequencies, amplitudes and/or phases over each of a second plurality of pixels on the array.

14. The method of claim 13, wherein said computing the first and second centroid comprises measuring the amplitudes over the first and second plurality of pixels corresponding to the first and second signal characteristics.

15. The method of claim 13, wherein the comparison of the first and second centroids comprises determining that there is one object if the first signal characteristic is detected and the second signal characteristic is not detected, and determining that there is more than one object if two or more signals with different signal characteristics are detected on at least one pixel of either the first or second plurality of pixels.

16. A system for resolving a number of objects in a target area, the system comprising:
an imager configured to:
image the target area with an array configured to detect a first image characteristic associated with electromagnetic radiation received at the array from the target area; and
further image the target area with the array configured to detect a second image characteristic associated with the electromagnetic radiation received at the array from the target area, the second image characteristic being different from the first image characteristic; and
a processing device configured to:
compute a first centroid for the first image characteristic and a second centroid for the second image characteristic;
compare respective locations of the first and second centroids; and
resolve the number of objects imaged by the array in response to the comparison of the first and second centroids.

17. The system of claim 16, wherein the first and second image characteristics comprise respective first and second polarizations of the electromagnetic radiation.

18. The system of claim 16, wherein the first and second image characteristics comprise first and second measured spectra of the received electromagnetic radiation.

19. The system of claim 16, wherein the first image characteristic comprises a first signal characteristic calculated from variations in frequencies, amplitudes, and/or phases each of a first plurality of pixels on the array, and the second image characteristic comprises a second signal characteristic calculated from variations in frequencies, amplitudes, and/or phases over each of a second plurality of pixels on the array.

20. The method of claim 1, wherein the objects are closely spaced from the perspective of the array, such that the number of closely spaced objects in the target region are unresolved prior to said resolving.

21. The system of claim 16, wherein the objects are closely spaced from the perspective of the array, such that the number of closely spaced objects in the target region are unresolved prior to said resolving.

* * * * *